May 7, 1940.  W. G. STEVENS, JR  2,199,421
MARKING MECHANISM FOR SEED PLANTERS
Filed Feb. 24, 1938  3 Sheets-Sheet 2
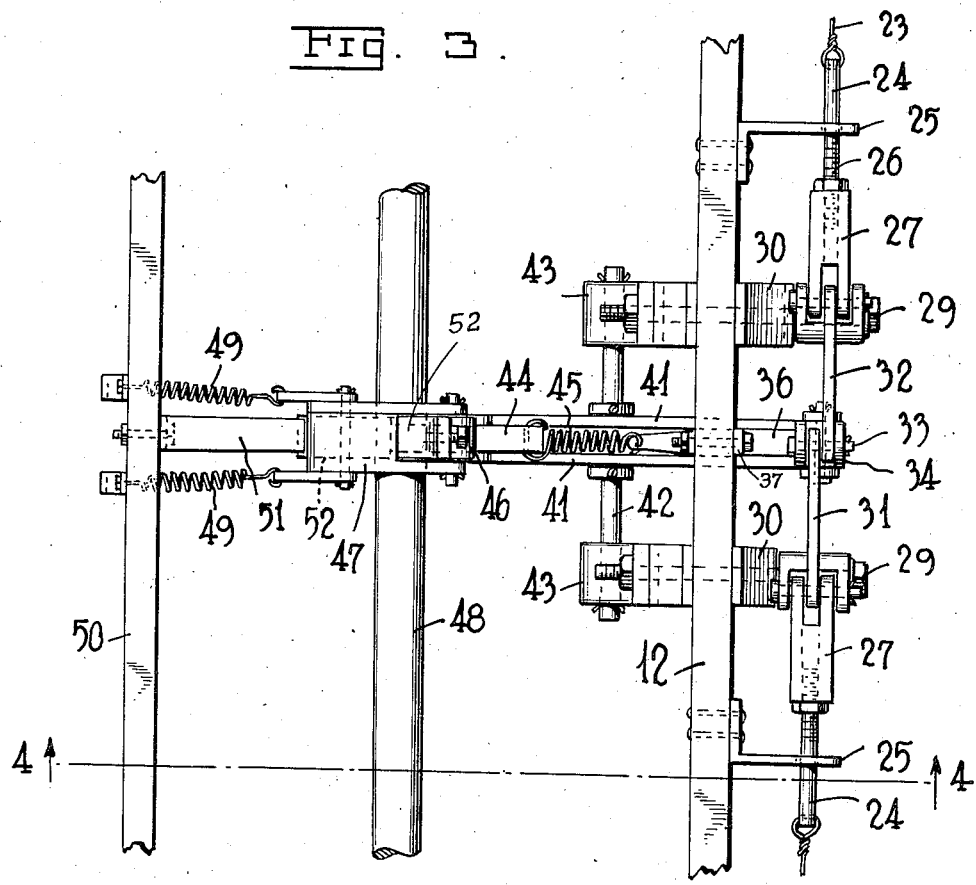
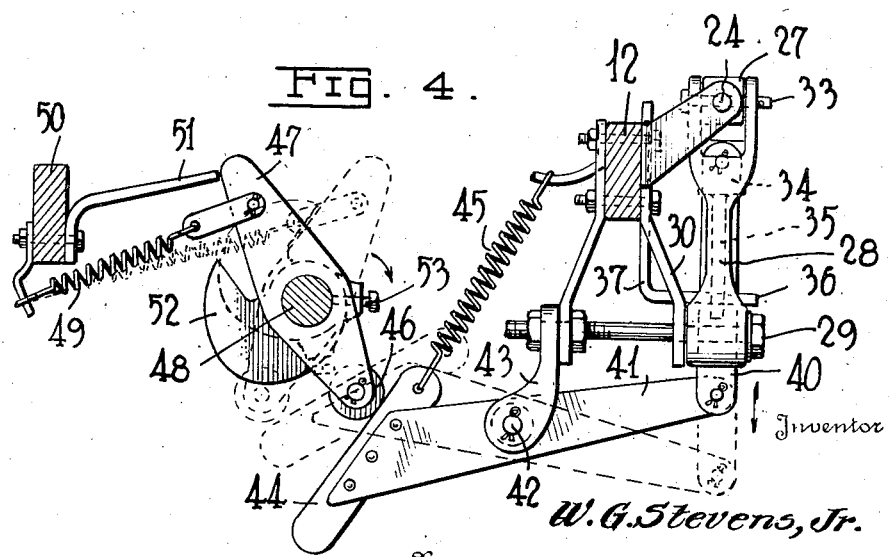
Inventor
W. G. Stevens, Jr.
By Seymour, Bright & Nottingham
Attorneys

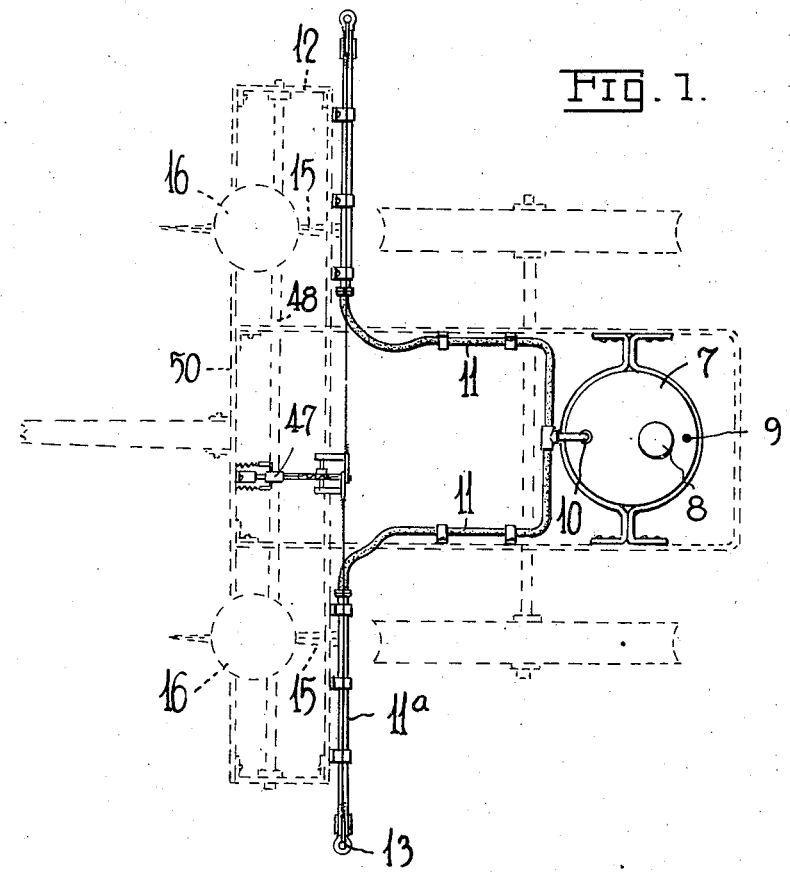
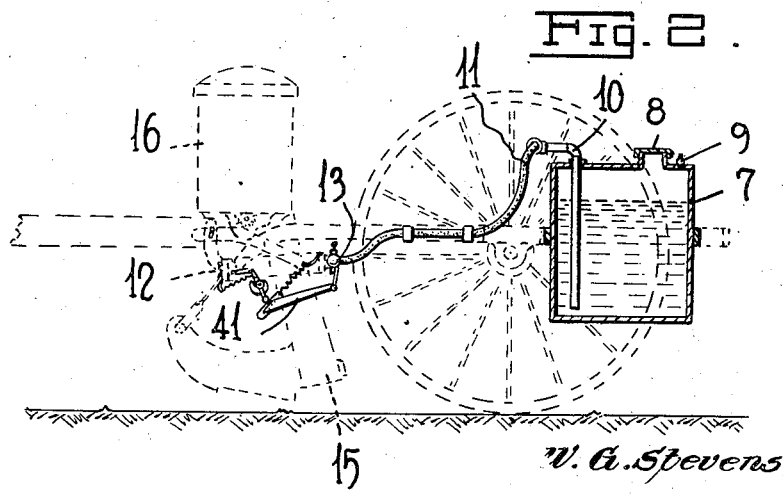

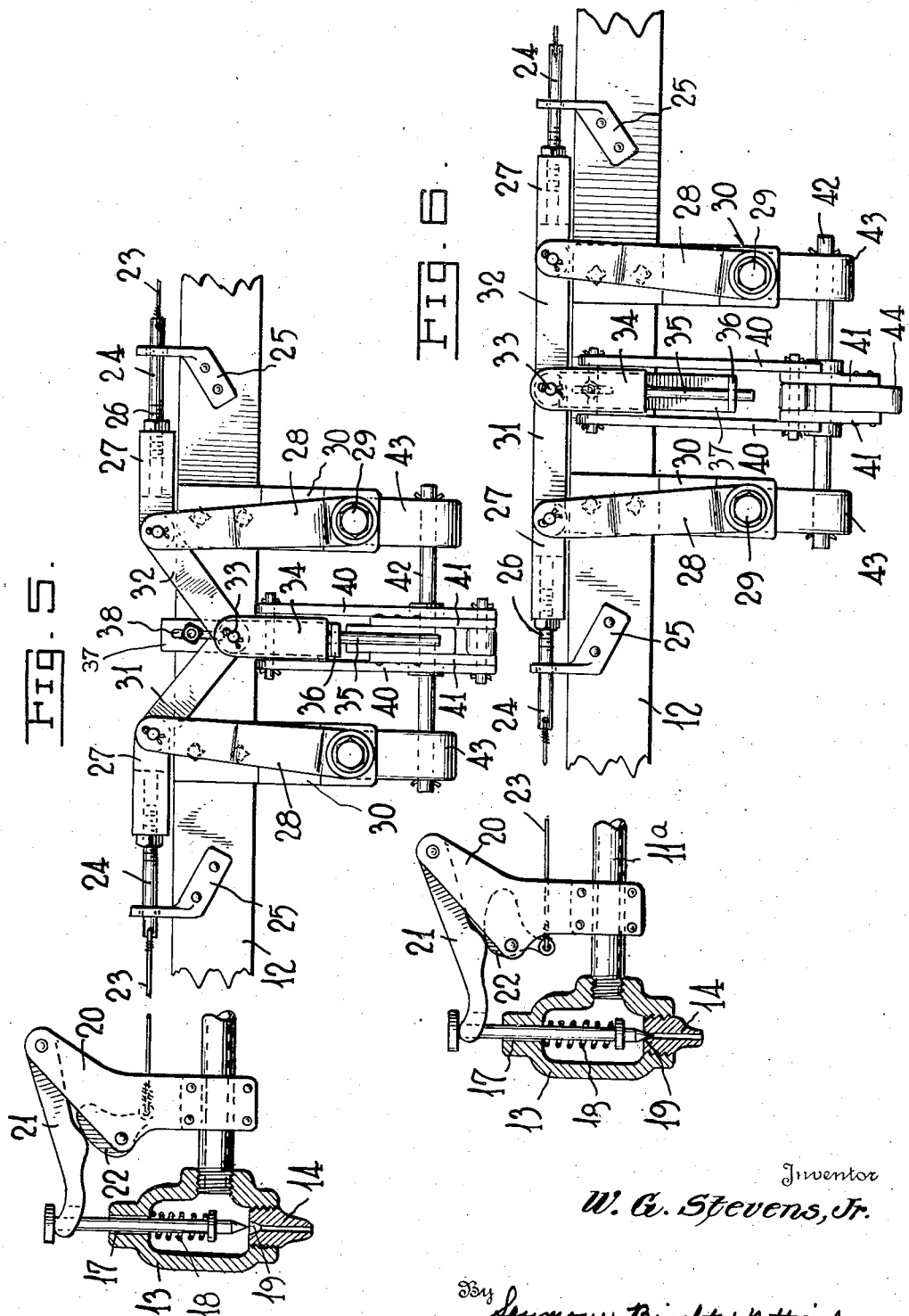

Patented May 7, 1940

2,199,421

UNITED STATES PATENT OFFICE 2,199,421

MARKING MECHANISM FOR SEED PLANTERS

William G. Stevens, Jr., Sykesville, Md.

Application February 24, 1938, Serial No. 192,348

17 Claims. (Cl. 111—25)

This invention relates to improvements in planters and more especially to novel means for use in marking in connection with check row corn planters.

The primary purpose of the present invention is to supply improved marking means capable of accurately marking and using a liquid as a marking medium.

Another object is to furnish a liquid marker having improved means for regulating the opening of the valves.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a top plan view of a corn planter shown in dotted lines and supplied with my improved marking means shown in full lines.

Fig. 2 is a side elevation of the corn planter in dotted lines and the marking means in full lines, the latter being shown partially in longitudinal vertical section.

Fig. 3 is an enlarged top plan view of a portion of the improved mechanism.

Fig. 4 is a longitudinal vertical sectional view on the line 4—4 of Fig. 3.

Fig. 5 is a rear elevation of a portion of the valve control means of the marking mechanism, partly broken away and partly in vertical section and with one of the valves in open position.

Fig. 6 is a similar view with the valve in closed position.

Referring to the drawings, 7 designates any suitable air-tight tank adapted to contain a suitable marking liquid, such as lime water, and to be mounted on the frame of a corn planter. The tank is provided with a suitable opening closed by a cap 8, and it is also provided with an air valve 9 to be attached to an air or tire pump so that the liquid in the container may be placed under air pressure.

A discharge pipe 10 leads from the bottom of the tank and is connected with suitable tubes 11 that extend to the ends of the runner frame 12 of the planter. Each tube terminates in a valve 13 having a depending nozzle 14 to direct a jet of marking liquid downwardly at the sides of the planter in lateral alignment with seeds dropped from the conventional boots 15, which are supplied with seed or corn from the usual hoppers 16.

Each valve preferably has a vertically disposed stem 17 which is slidable upwardly and downwardly in the valve casing, and a coil spring 18 is arranged in the casing and acts on the stem to normally hold the valve needle 19 in engagement with its seat.

The portions of the tubes 11a, which carry the valves, are rigid and secured to the runner frame 12, and each tube carries a bracket 20 forming a support for a valve lifter 21 and a cam 22; both of these elements being pivotally mounted on the bracket and normally contacting with one another under the influence of the spring 18.

The cams are preferably connected by wires 23 to pins 24, the latter being slidable in brackets 25 and having threaded connections at 26 with blocks 27. By means of the threaded connections the tautness of the wires may be adjusted.

The air pressure above the liquid in the tank 7 provides the force necessary to eject a jet of liquid through nozzle 14 at the time the valve needle 19 is raised from its seat in a manner soon to be described.

Each block 27 is pivotally connected to the upper end of a rocking lever 28 that is pivotally secured at 29 to a bracket 30, and the upper ends of the levers are pivotally connected by a pair of links 31 and 32, pivotally secured at 33 to an operating member 34.

The operating member is guided vertically by its depending leg 35 which slides in the foot 36 of a bracket 37 that is adjustably mounted on the rear bar of the runner frame, preferably by a slot and pin connection 38 (see Fig. 5).

Links 40 have their upper ends connected to the operating member 34, and their lower ends (see Fig. 4) are pivotally connected to the rear end of a lever 41, the latter being fulcrumed at 42 in a bracket 43 that is rigidly connected to the rear bar of the runner frame 12.

Lever 41 is rigidly secured to a cam face 44 that is normally held by a spring 45 in contact with a roller 46, the latter being carried by rocking member 47, which is loosely mounted on the conventional oscillating check shaft 48 of the planter. A spring 49 has one of its ends connected to the front bar 50 of the runner frame of the planter and its other end connected to the upper end portion of the rocking member 47, and tends to yieldingly hold the member 47 in engagement with an abutment 51 that is rigidly secured to the front bar of the runner frame.

A cam 52 is rigidly secured to the check shaft by any suitable means, such as a screw 53, and each time the check shaft oscillates to drop seed or corn in the customary manner, the nose of the cam 52 will engage the upper portion of the rocking member 47 and will cause it to move in a clockwise direction (see Fig. 4). Consequently, the roller 46 will move in a direction away from the cam 44, and the spring 45 will then act to lift the forward end of the lever 41 and swing it into the dotted line position.

This will cause the lever 41 to pull the links 40 downwardly until the lower end of the block 34 contacts with the abutment or shelf 36. During such movement the wires 23 will actuate the cams 22, and they will cause the lifters 21 to open the valves and discharge jets of liquid or marking fluid at opposite sides of the planter.

Referring again to Fig. 4, it will be understood that immediately after the check shaft 48 is restored to normal position, the spring 49 will act to rotate the rocking member 47 in a counterclockwise direction, and this will cause the roller 46 to again restore the lever 41 to full line position as shown in Fig. 4. Consequently the parts will be free to permit the springs 18 to immediately close the valves.

As the action of the check shaft 48 in a check row planter is instantaneous, it will be understood that the valves will be actuated instantaneously, so that the marking liquid will only be deposited at the points desired.

By adjusting the bracket 37 upwardly or downwardly, the amount of opening of the valves may be regulated uniformly.

While I have disclosed a workable embodiment of the invention, it will be readily understood by those skilled in the art, that many changes may be made in the details disclosed without departing from the spirit of the invention as expressed in the claims.

What I claim and desire to secure by Letters Patent is:

1. The combination with a check row planter having a check shaft, of liquid marking means operatively connected with said shaft and arranged to eject a jet of liquid in alignment with dropped seed, each time seed is deposited by the planter, the last-mentioned means comprising a cam fixed to the check shaft and a rocking member loosely mounted on the shaft and moved in one direction by said cam.

2. The combination with a check row planter having a check shaft, a liquid marking means operatively connected with said shaft and arranged to eject a jet of liquid in alignment with dropped seed, each time seed is deposited by the planter, the last-mentioned means comprising a cam fixed to said shaft, a rocking member loosely mounted on the shaft and actuated by the cam, and means for yieldingly holding the rocking member in a normal position.

3. The combination with a check row planter having a check shaft, of liquid marking means operatively connected with said shaft and arranged to eject a jet of liquid in alignment with dropped seed, each time seed is deposited by the planter, the last-mentioned means comprising a cam fixed to said shaft, a rocking member loosely mounted on the shaft and actuated by the cam, and means for yieldingly holding the rocking member in a normal position, and a lever controlled by said rocking member.

4. In a check row corn planter having a runner frame, tubes projecting outwardly from the ends of said frame, valves supplied with liquid by the tubes, means for supplying liquid under pressure to the tubes, and means actuated by the planter for opening said valves each time the planter deposits seed.

5. In a check row corn planter having a runner frame, tubes projecting outwardly from the ends of said frame, valves supplied with liquid by the tubes, means for supplying liquid under pressure to the tubes, and means actuated by the planter for opening said valves each time the planter deposits seed, the last-mentioned means comprising an oscillating shaft, a cam fixed to the shaft, a rocking member loosely mounted on the shaft and adapted to be moved in one direction by said cam, and means operatively connecting the oscillating member to said valves.

6. In a check row corn planter having a runner frame, tubes projecting outwardly from the ends of said frame, valves supplied with liquid by the tubes, means for supplying liquid to the tubes, means actuated by the planter for opening said valves each time the planter deposits seed, and means operatively associated with the valves for simultaneously adjusting the extent to which the valves may open.

7. Liquid marking means for planters comprising valves, a reciprocating block, an adjustable bracket for guiding the block and regulating the extent of its movement in one direction, and means operatively connecting the block to said valves.

8. A liquid marker for planters comprising a reciprocating block, a pin adjustably connected to the block, an oscillating cam, a flexible connection joining the cam and pin, a valve having a stem, and means actuated by the cam for moving the stem in the direction in which the valve opens.

9. In a check row corn planter of the type having a runner frame and check shaft, a liquid container carried by the planter, a valve arranged near one end of the runner frame, means for conveying liquid from the container to the valve, and means operatively connecting the valve to said check shaft whereby the valve is opened to deposit a jet of liquid on the ground each time seed is deposited by the planter.

10. In a corn planter having a check shaft and a runner frame, pipes projecting from opposite ends of the runner frame, valves supplied with liquid by the pipes and arranged in alignment with the seed boots of the planter, means for supplying liquid to the pipes, and means operatively connecting the valves to said check shaft whereby the valves are opened each time the planter deposits seed.

11. In a check row corn planter of the type having a runner frame and a check shaft, of pipes projecting from opposite ends of the runner frame, valves for controlling the discharge of liquid from the pipes and arranged substantially in alignment with the seed boots of the planter, and means operatively connecting the valves to said shaft whereby the valves are opened each time the shaft is actuated.

12. The combination with a corn planter having a runner frame and check shaft, of pipes projecting from opposite ends of the runner frame, valves carried by the pipes and arranged in substantial alignment with the seed boots of the planter, and means operatively connecting the valves to said check shaft whereby the valves are opened each time the check shaft is actuated.

13. In a corn planter having a check shaft and a runner frame, a liquid container carried by the planter, pipes projecting from opposite ends of the runner frame, valves arranged at the outer ends of the pipes in lateral alignment with seed boots of the planter, means for conveying liquid under pressure from the container to the pipes, and means operatively connecting the valves to said check shaft whereby the valves are opened each time the planter deposits seeds.

14. The combination with a seed planter having seed boots, of means controlled by the planter and comprising nozzles positioned laterally and outwardly of the boots for ejecting jets of marking liquid from the nozzle each time the planter drops seed.

15. The combination with a check row corn planter having seed boots, of liquid marking means controlled by the planter and comprising a nozzle positioned laterally and outwardly of one of said boots to deliver a jet of marking liquid each time the corn planter drops seed.

16. The combination with a check row planter having a check shaft and seed boots, of liquid marking means operatively connected with said shaft and comprising a nozzle positioned at the outer side of one of said boots and arranged to eject a jet of liquid in lateral alignment with dropped seed, each time seed is deposited by the last-mentioned boot.

17. In a corn planter having seed boots, a liquid controlling valve arranged on the planter at the outer side of one of said boots and in substantially lateral alignment with said boots, means for supplying liquid under pressure to the valve, and means controlled by the planter for actuating the valve each time seed is deposited by said boots.

WILLIAM G. STEVENS, Jr.